(12) United States Patent
Park

(10) Patent No.: US 11,084,473 B2
(45) Date of Patent: Aug. 10, 2021

(54) ELECTRIC BRAKE SYSTEM AND CONTROL METHOD THEREOF

(71) Applicant: MANDO CORPORATION, Gyeonggi-do (KR)

(72) Inventor: Yulshin Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 201 days.

(21) Appl. No.: 16/147,498

(22) Filed: Sep. 28, 2018

(65) Prior Publication Data

US 2019/0100180 A1 Apr. 4, 2019

(30) Foreign Application Priority Data

Sep. 29, 2017 (KR) .................. 10-2017-0127119

(51) Int. Cl.
*B60T 8/18* (2006.01)
*B60T 8/40* (2006.01)
(Continued)

(52) U.S. Cl.
CPC ........... *B60T 8/4081* (2013.01); *B60T 7/042* (2013.01); *B60T 8/17* (2013.01); *B60T 8/88* (2013.01);
(Continued)

(58) Field of Classification Search
None
See application file for complete search history.

(56) References Cited

U.S. PATENT DOCUMENTS

| 6,213,572 B1 * | 4/2001 | Linkner, Jr. ............ B60T 8/326 303/113.4 |
| 2006/0158032 A1 * | 7/2006 | Miyazaki .............. B60T 8/4081 303/155 |

(Continued)

FOREIGN PATENT DOCUMENTS

| JP | 2008230514 A | * 10/2008 |
| KR | 10-2012-0044899 | 5/2012 |

(Continued)

OTHER PUBLICATIONS

English-language abstract for JP 2008-230514 (2009).*

(Continued)

*Primary Examiner* — Nicholas J Lane
(74) *Attorney, Agent, or Firm* — Ladas & Parry, LLP

(57) ABSTRACT

An electric brake system, and more particularly, to an electric brake system and a control method thereof configured for controlling an amount of current applied to a valve in response to a driver's braking intent. The electric brake system according to an embodiment includes a hydraulic pressure circuit; an inlet valve provided in the hydraulic pressure circuit, configured to control the flow of a hydraulic pressure; a pressure sensor configured to sense a leak of the electric brake system; a pedal displacement sensor configured to sense an amount of requested braking according to (Continued)

the deceleration intent of a driver; and a controller configured to control an amount of current applied to the inlet valve provided in the hydraulic pressure circuit in which the sensed leak occurs, based on the sensed driver's requested braking amount.

16 Claims, 6 Drawing Sheets

(51) Int. Cl.
*B60T 17/22* (2006.01)
*B60T 13/68* (2006.01)
*B60T 7/04* (2006.01)
*B60T 8/17* (2006.01)
*B60T 13/16* (2006.01)
*B60T 13/58* (2006.01)
*B60T 13/74* (2006.01)
*B60T 13/66* (2006.01)
*B60T 8/88* (2006.01)
*B60T 8/92* (2006.01)

(52) U.S. Cl.
CPC .............. *B60T 8/92* (2013.01); *B60T 13/161* (2013.01); *B60T 13/166* (2013.01); *B60T 13/58* (2013.01); *B60T 13/662* (2013.01); *B60T 13/686* (2013.01); *B60T 13/745* (2013.01); *B60T 17/221* (2013.01); *B60T 2270/402* (2013.01); *B60T 2270/403* (2013.01); *B60T 2270/404* (2013.01); *B60T 2270/413* (2013.01); *B60T 2270/82* (2013.01)

(56) References Cited

U.S. PATENT DOCUMENTS

| | | | | |
|---|---|---|---|---|
| 2009/0112434 A1* | 4/2009 | Park | ................. | B60T 7/042 701/75 |
| 2011/0316326 A1* | 12/2011 | Miyazaki | ................. | B60T 8/344 303/2 |
| 2012/0126610 A1* | 5/2012 | Nakata | ................. | B60T 8/4081 303/9.63 |
| 2012/0235469 A1* | 9/2012 | Miyazaki | ................. | B60T 8/885 303/9.63 |
| 2014/0008965 A1* | 1/2014 | Ito | ................. | B60T 13/58 303/3 |
| 2015/0158476 A1* | 6/2015 | Miyazaki | ................. | B60T 13/686 303/10 |
| 2019/0322261 A1* | 10/2019 | Hienz | ................. | B60T 13/58 |

FOREIGN PATENT DOCUMENTS

| | | |
|---|---|---|
| KR | 10-1323861 | 10/2013 |
| KR | 10-2017-0031402 | 3/2017 |

OTHER PUBLICATIONS

Office Action dated Nov. 5, 2018 for Korean Patent Application No. 10-2017-0127119 and its English machine translation by Google Translate.

* cited by examiner

ELECTRIC BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2017-0127119, filed on Sep. 29, 2017 in the Korean Intellectual Property Office, the disclosure of which is incorporated by reference in its entirety.

BACKGROUND

1. Technical Field

Embodiments of the present disclosure relate to an electric brake system, and more particularly, to an electric brake system and a control method thereof configured to control an amount of current applied to a valve in response to a driver's braking intent.

2. Description of the Related Art

A brake system for braking is necessarily equipped in a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a drive wheel from slipping when a vehicle is suddenly unintentionally accelerated or intentionally accelerated, an electronic stability control (ESC) system for stably maintaining a driving state of a vehicle by combining an ABS with traction control to control a hydraulic pressure of a brake, and the like.

Generally, an electric brake system includes a hydraulic pressure supply device which receives a braking intent from a driver in a form of an electrical signal from a pedal displacement sensor which senses a displacement of a brake pedal when the driver depresses the brake pedal and then supplies a hydraulic pressure to a wheel cylinder.

SUMMARY

Therefore, it is an aspect of the present disclosure to prevent a leak that occurs in an electric brake system by controlling an amount of current applied to a valve in response to a driver's braking intent and secure a braking force of a vehicle.

Additional aspects of the disclosure will be set forth in part in the description which follows and, in part, will be obvious from the description, or may be learned by practice of the disclosure.

In accordance with an aspect of the present disclosure, an electric brake system includes: a pedal input sensing device configured to sense an amount of requested braking according to the deceleration intent of a driver; and a controller configured to control an amount of current applied to a valve for adjusting the amount of hydraulic pressure transmitted to a wheel to a predetermined value corresponding to the sensed driver's requested braking amount.

The electric brake system may further include: a master cylinder configured to discharge oil according to a stroke of a brake pedal; a hydraulic pressure supply device connected to the master cylinder and a reservoir in which oil is stored, and configured to generate a hydraulic pressure using a rotational force of a motor operated by an electric signal outputted from a pedal position sensor; a first hydraulic pressure circuit configured to transmit a hydraulic pressure discharged from the hydraulic pressure supply device to a wheel cylinder provided in at least one wheel; and a second hydraulic pressure circuit configured to transmit the hydraulic pressure discharged from the hydraulic pressure supply device to the wheel cylinder provided in the at least one wheel.

The controller may control the amount of current applied to the valve included in a hydraulic circuit determined to be leaking to a predetermined value corresponding to the sensed driver's requested braking amount when the first hydraulic pressure circuit or the second hydraulic pressure circuit in the electric brake system is determined to be leaking.

The controller may generate a control signal for increasing the amount of current applied to an inlet valve when the sensed driver's requested braking amount is greater than or equal to a predetermined value and generate the control signal for decreasing the amount of current applied to the inlet valve when the sensed driver's requested braking amount is less than the predetermined value.

The valve may include the inlet valve. The controller may control the amount of current applied to the inlet valve to control the degree to which the inlet valve is closed.

The inlet valve may be a normally open type that is opened when the current is not applied and is closed when the current is applied.

The controller may control the amount of current applied to the valve for controlling the amount of hydraulic pressure transmitted to the wheel to a predetermined value after a preset threshold time in response to the sensed driver's requested braking amount.

The pedal input sensing device may include a pedal displacement sensor configured to sense a displacement of the brake pedal depressed by the driver.

In accordance with another aspect of the present disclosure, an electric brake control method includes: sensing a leak of an electronic brake system; sensing an amount of requested braking according to the deceleration intent of a driver; and controlling an amount of current applied to an inlet valve provided in a hydraulic pressure circuit in which the sensed leak occurs, based on the sensed driver's requested braking amount.

The controlling of the amount of current applied to the inlet valve may include controlling the amount of current applied to the inlet valve to a predetermined value corresponding to the sensed driver's requested braking amount.

The controlling of the amount of current applied to the inlet valve may include generating a control signal for increasing the amount of current applied to the inlet valve when the sensed driver's requested braking amount is greater than or equal to a predetermined value and generating the control signal for decreasing the amount of current applied to the inlet valve when the sensed driver's requested braking amount is less than the predetermined value.

The controlling of the amount of current applied to the inlet valve may further include: controlling the amount of current applied to the inlet valve to control the degree to which the inlet valve is closed.

The sensing of the amount of requested braking according to the deceleration intent of the driver may include sensing a displacement of a brake pedal depressed by the driver and sensing the requested braking amount.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
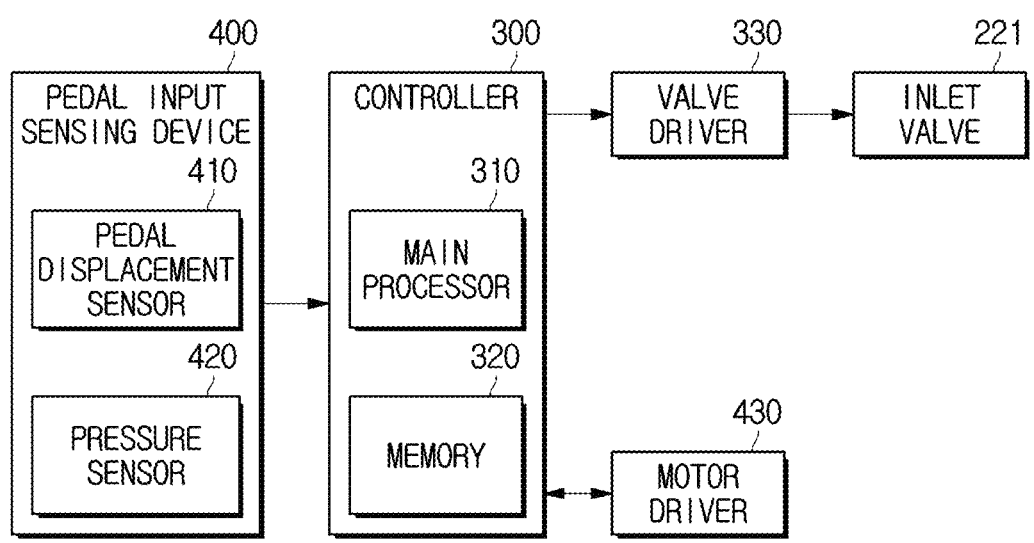
FIG. 1 is a control block diagram of an electric brake system according to an embodiment.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and sizes of components may be somewhat exaggerated to facilitate understanding.

Figure 2:
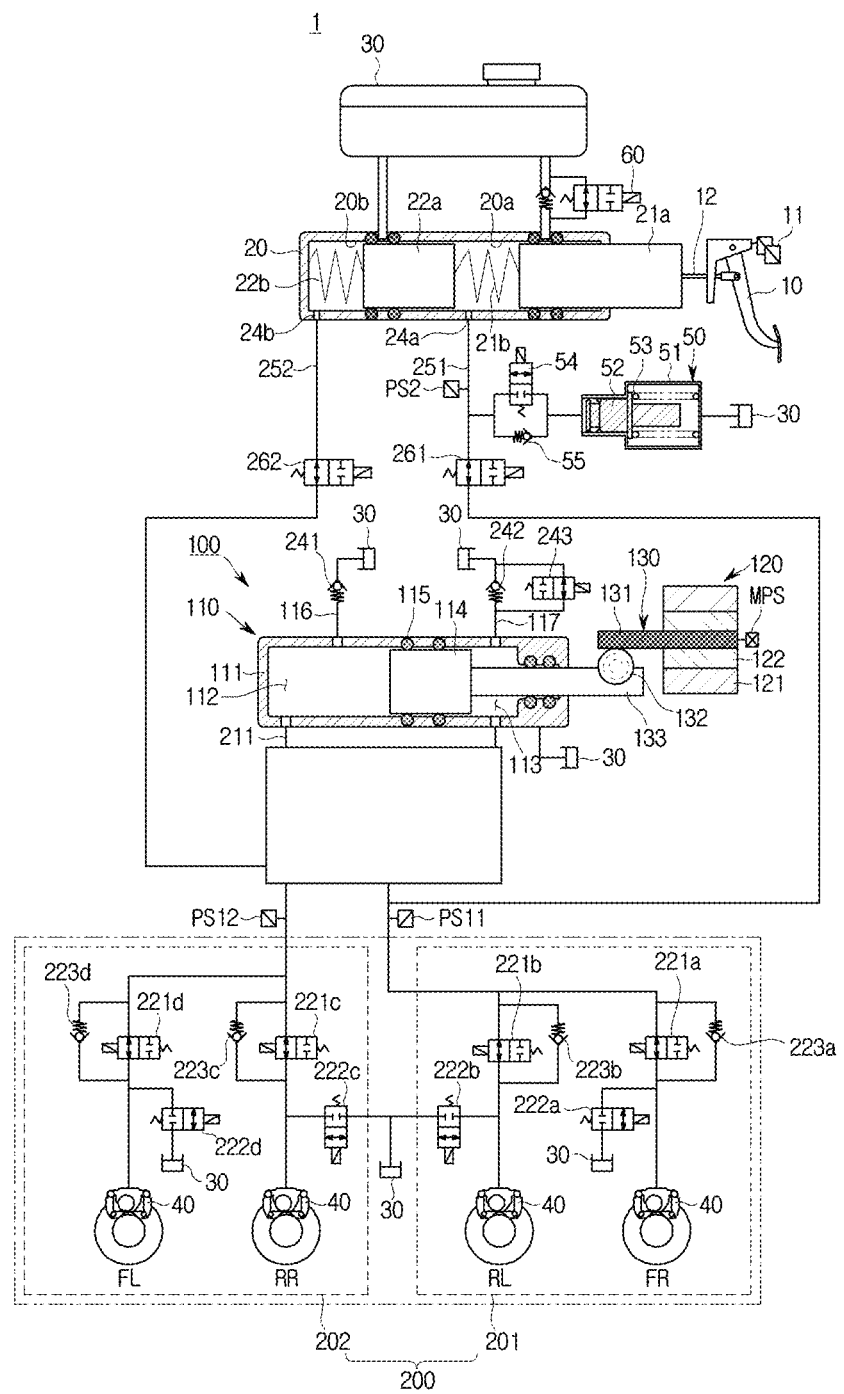
FIG. 2 is a schematic hydraulic pressure circuit diagram including an inlet valve of a wheel in the electric brake system according to an embodiment.

FIG. 1 is a control block diagram of an electric brake system according to an embodiment and FIG. 2 is a schematic hydraulic pressure circuit diagram including an inlet valve of a wheel in the electric brake system according to an embodiment.

Referring to FIG. 1, an electric brake system 1 may include a controller 300 for controlling the electric brake system 1 as a whole, a pedal input sensing device 400, a valve driver 330 and a motor driver 430 that are controlled by the controller 300.

The pedal input sensing device 400 may include a plurality of pressure sensors in the circuit diagram of the electric brake system 1 illustrated in FIG. 2. In particular, the sensors included in the pedal input sensing device 400 may include PS11, PS12, PS2, MPS, and a pedal displacement sensor 410 illustrated in FIG. 2.

When braking by a driver is started, the pedal displacement sensor 410 may sense the driver's requested braking amount based on information such as the pressure of a brake pedal 10 that the driver depresses. The controller 300 may receive an electrical signal output from the pedal displacement sensor 410 to drive a motor 120.

The valve driver 330 may include a plurality of valves. In particular, all the valves included in the circuit diagram of the electric brake system 1 illustrated in FIG. 2 may be included in the valve driver 330 and controlled to be opened or closed according to a control signal of the controller 300.

A motor driver 530 may drive the motor 120 included in the circuit diagram of the electric brake system 1 illustrated in FIG. 2.

More particular, the motor driver 430 may receive the control signal from the controller 300 and drive the motor 120. That is, when the displacement generates in the brake pedal 10, a signal sensed by the pedal displacement sensor 410 is transmitted to the controller 300, and the controller 300 drives the motor 120 in one direction to rotate a worm shaft 131 in one direction and the rotational force of the worm shaft 131 is transmitted to a drive shaft 133 via a worm wheel 132. When a hydraulic piston 114 connected to the drive shaft 133 moves, it is possible to generate a fluid pressure in chambers 112 and 113.

The controller 300 may include a main processor 310 for controlling the electric brake system 1 as a whole, and a memory 320 for storing various programs and control methods.

The main processor 310 may calculate the opening and closing of the valve and the requested pressure on the front and rear wheels based on the pressure information from the pedal input sensing device 400 and control the opening and closing of the valve and the driving amount of the motor accordingly.

In addition, the controller 300 may control the amount of current applied to an inlet valve 221 based on the driver's braking intent. At this time, the inlet valve 221 whose the amount of current is adjusted based on the driver's braking intent may be a normally open NO valve.

A method of controlling the amount of current applied to the inlet valve 221 by the controller 300 based on the driver's braking intent will be described in detail in the embodiments of FIGS. 3 and 4 described later.

However, the hydraulic pressure circuit diagram of the electric brake system 1 including the inlet valve 221 operated by the controller 300 will be described.

Referring to FIG. 2, the electric brake system 1 is generally configured with a master cylinder 20 configured to generate a hydraulic pressure, a reservoir 30 coupled to an upper part of the master cylinder 20 to store oil, an input rod 12 configured to pressurize the master cylinder 20 according to a pedal effort of the brake pedal 10, a wheel cylinder 40 configured to receive the hydraulic pressure and perform braking of each of wheels RR, RL, FR, and FL, a pedal displacement sensor 11 configured to sense a displacement of the brake pedal 10, and a simulation device 50 configured to provide a reaction force according to the pedal effort of the brake pedal 10.

The master cylinder 20 may be configured to include at least one chamber to generate a hydraulic pressure. As an example, the master cylinder 20 may include a first master chamber 20a and a second master chamber 20b.

The first master chamber 20a may be provided with a first piston 21a connected to the input rod 12 and the second master chamber 20b may be provided with a second piston 22a. The first master chamber 20a may communicate with a first hydraulic pressure port 24a to allow the oil to flow in and out. The second master chamber 20b may communicate with a second hydraulic pressure port 24b to allow the oil to flow in and out. For example, the first hydraulic pressure port 24a may be connected to a first backup flow path 251, and the second hydraulic pressure port 24b may be connected to a second backup flow path 252.

The master cylinder 20 may include the first and second master chambers 20a and 20b to secure safety if one chamber fails. For example, the first master chamber 20a of the first and second master chambers 20a and 20b may be connected to the front right wheel FR and the rear left wheel RL of the vehicle through the first backup flow path 251, and the remaining second master chamber 20b may be connected to the front left wheel FL and the rear right wheel RR of the vehicle through the second backup flow path 252. As described above, the first and second master chambers 20a and 20b may be independently configured such that braking of the vehicle may be possible even when one of the first and second master chambers 20a and 20b fails.

Unlike the one illustrated in the drawing, one master chamber of two master chambers may be connected to the two front wheels FR and FL, and the remaining master chamber may be connected to the two rear wheels RR and RL. In addition, one master chamber of the two master chambers may be connected to the left front wheel FL and the left rear wheel RL, and the remaining master chamber may be connected to the right rear wheel RR and the right front wheel FR. That is, the positions of the wheels connected to the master chambers of the master cylinder 20 may be variously configured.

Also, a first spring 21b may be provided between the first piston 21a and the second piston 22a of the master cylinder 20, and a second spring 22b may be provided between the second piston 22a and a distal end of the master cylinder 20. That is, the first spring 21b may be accommodated in the first master chamber 20a and the second spring 22b may be accommodated in the second master chamber 20b.

The first spring 21b and the second spring 22b are compressed by the first piston 21a and the second piston 22a which move as a displacement of the brake pedal 10 is varied, and thus an elastic force is stored. Further, when a force pushing the first piston 21a is less than the elastic force, the first spring 21b and the second spring 22b may use the stored restoring elastic force to push the first and second pistons 21a and 22a, respectively and return the first and second pistons 21a and 22a to their original positions.

The input rod 12 configured to pressurize the first piston 21a of the master cylinder 20 may be in close contact with the first piston 21a. That is, there may be no gap between the master cylinder 20 and the input rod 12. Consequently, when the brake pedal 10 is depressed, the master cylinder 20 may be directly pressurized without a pedal dead stroke section.

The first master chamber 20a may be connected to the reservoir 30 through a first reservoir flow path 61 and the second master chamber 20b may be connected to the reservoir 30 through a second reservoir flow path 62.

The master cylinder 20 may include two sealing members 25a and 25b disposed on the front and rear of the first reservoir flow path 61 and two sealing members 25c and 25d disposed on the front and rear sides of the second reservoir flow path 62. The sealing members 25a, 25b, 25c and 25d may be in the form of a ring protruding from the inner wall of the master cylinder 20 or the outer peripheral surface of the first and second pistons 21a and 22a.

A check valve 64 for preventing the flow of the oil flowing from the first master chamber 20a to the reservoir 30 while allowing the flow of oil flowing from the reservoir 30 to the first master chamber 20a may be provided in the first reservoir flow path 61. The check valve 64 may be provided to allow only one directional fluid flow.

The front and rear of the check valve 64 of the first reservoir flow path 61 may be connected by a bypass flow path 63. The check valve 60 may be provided on the bypass flow path 63.

The check valve 60 may be provided as a bidirectional control valve for controlling the flow of oil between the reservoir 30 and the master cylinder 20. The check valve 60 may be a normally open type solenoid valve that is normally open and operates to close the valve when receiving a close signal from the controller 300.

The controller 300 may be an electronic control unit (ECU), and the controller 300 may include the main processor 310 for controlling the electric brake system 1 as a whole, and the memory 320 for storing various programs and control methods as illustrated in FIG. 1.

The simulation device 50 may be connected to the first backup flow path 251 to provide a reaction force according to a pedal effort of the brake pedal 10. A reaction force may be provided to compensate for a pedal effort provided from the driver such that a braking force may be finely controlled as intended by the driver.

The simulation device 50 includes a simulation chamber 51 provided to store oil flowing out from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are installed to have a predetermined range of a displacement within the simulation chamber 51 by oil flowing therein.

On the other hand, the reaction force spring 53 is only one embodiment capable of providing the elastic force to the reaction force piston 52, and may include various embodiments capable of storing the elastic force by deforming the shape.

For example, the reaction force spring 53 may be made of a material such as rubber, or may include various members capable of storing the elastic force by having a coil or a plate shape.

The simulation valve 54 may be provided at a flow path connecting the rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns, oil in the reservoir 30 may flow into the simulation chamber 51 through the simulator valve 54 so that the inside of the simulation chamber 51 is entirely filled with the oil.

A plurality of the reservoirs 30 are illustrated in the drawing, and the same reference number is assigned to each of the plurality of reservoirs 30. Here, the reservoirs 30 may be configured with the same components, and may alternatively be configured with different components. As one example, the reservoir 30 connected to the simulation device 50 may be the same as the reservoir 30 connected to the master cylinder 20, or may be a storage part capable of storing oil separately from the reservoir 30 that is connected to the master cylinder 20.

The simulator valve 54 may be configured with a normally closed type solenoid valve that is usually kept in a closed state. When the driver applies a pedal effort to the brake pedal 10, the simulator valve 54 may be opened to deliver oil in the simulation chamber 51 to the reservoir 30.

Also, a simulator check valve 55 may be installed to be connected in parallel with the simulator valve 54 between the pedal simulator and the reservoir 30. The simulator check valve 55 may allow the oil in the reservoir 30 to flow toward the simulation chamber 51 and may block the oil in the simulation chamber 51 to flow into the reservoir 30 through a flow path at which the simulator check valve 55 is installed. A quick return of the pedal simulator pressure may be secured because the oil can be supplied into the simulation chamber 51 through the simulator check valve 55 when the brake pedal 10 is released.

The operation of the simulation device 50 will be described. The oil in the simulation chamber 51 which pushes the reaction force piston 52 of the pedal simulator while compressing the reaction force spring 53 is transmitted to the reservoir 30 through the simulator valve 54 when the driver applies pressure to the brake pedal 10. The driver may be provided with a pedal feeling during this process.

When the driver releases his or her foot from the brake pedal 10, the reaction force piston 52 may return the reaction force piston 52 to the original state while the reaction force spring 53 pushes the reaction force piston 52, and the oil in the reservoir 30 may be filled into the simulation chamber 51 while the oil in the reservoir 30 flows into the simulation chamber 51 through the flow path in which the simulator valve 54 is installed and the flow path in which the simulator check valve 55 is installed.

As described above, since the inside of the simulation chamber 51 is always filled with the oil, the friction of the reaction force piston 52 may be minimized during operation of the simulation device 50, so that the durability of the simulation device 50 can be improved and the inflow of foreign matter from the outside may be blocked.

The electric brake system 1 according to the embodiment of the present disclosure may include a hydraulic pressure supply device 100 configured to operate mechanically and to receive a braking intent from the driver in a form of an electrical signal from the pedal displacement sensor 410 sensing a displacement of the brake pedal 10; a hydraulic pressure controller 200 configured with first and second hydraulic pressure circuits 201 and 202, which are each provided with two wheels among the wheels RR, RL, FR, and FL and configured to control the flow of a hydraulic pressure delivered to the wheel cylinders 40 provided at the wheels RR, RL, FR, and FL; a first cut valve 261 provided at the first backup flow path 251 connecting the first hydraulic pressure port 24a to the first hydraulic pressure circuit 201 and configured to control the flow of the hydraulic pressure; a second cut valve 262 provided at the second backup flow path 252 connecting the second hydraulic pressure port 24b to the second hydraulic pressure circuit 202 and configured to control the flow of the hydraulic pressure; and the controller 300 configured to control the hydraulic pressure supply device 100 and valves 54, 60, 221a, 221b, 221c, 221d, 222a, 222b, 222c, 222d, 233, 235, 236, and 243 based on hydraulic pressure information and pedal displacement information.

The hydraulic pressure supply device 100 may include a hydraulic pressure supply unit 110 configured to provide oil pressure delivered to the wheel cylinders 40, the motor 120 configured to generate a rotational force in response to an electrical signal from the pedal displacement sensor 11, and a power converter 130 configured to convert a rotational movement of the motor 120 into a rectilinear movement and transmit the rectilinear movement to the hydraulic pressure supply unit 110. Alternatively, the hydraulic pressure supply unit 110 may operate by a pressure provided from a high-pressure accumulator instead of a driving force supplied from the motor 120.

The hydraulic pressure supply unit 110 includes a cylinder block 111 in which a pressure chamber configured to receive and store oil is formed, the hydraulic piston 114 accommodated inside the cylinder block 111, sealing members 115 (that is, 115a and 115b) provided between the hydraulic piston 114 and the cylinder block 111 and configured to seal the pressure chamber, and the drive shaft 133 connected to a rear end of the hydraulic piston 114 and configured to transmit power which is output from the power converter 130 to the hydraulic piston 114.

The pressure chamber may include the first pressure chamber 112 located at a front side (in a forward direction, that is, toward the left in the drawing) of the hydraulic piston 114, and the second pressure chamber 113 located at a rear side (in a backward direction, that is, toward the right in the drawing) of the hydraulic piston 114. That is, the first pressure chamber 112 is comparted by the cylinder block 111 and a front end of the hydraulic piston 114 and is configured to have a volume that varies according to a movement of the hydraulic piston 114, and the second pressure chamber 113 is comparted by the cylinder block 111 and a rear end of the hydraulic piston 114 and is configured to have a volume that varies according to the movement of the hydraulic piston 114.

The flow paths connected to the first pressure chamber 112 and the second pressure chamber 113 are blocked, but the hydraulic pressure may be transmitted to the first hydraulic pressure circuit 201 and the second hydraulic pressure circuit 202 through the block-processed regions.

The hydraulic pressure supply unit 110 of the electric brake system 1 according to the embodiment of the present disclosure may operate with double action.

Next, the motor 120 and the power converter 130 of the hydraulic pressure supply device 100 will be described.

The motor 120 is a device configured to generate a rotational force according to a signal output from the controller 300 and may generate the rotational force in a forward or backward direction. An angular velocity and a rotational angle of the motor 120 may be precisely controlled. Since the motor 120 is a publicly known technique, a detailed description thereof will be omitted.

The controller 300 controls the motor 120 as well as valves provided at the electric brake system 1 of the present disclosure, which will be described below. An operation, which controls the plurality of valves according to a displacement of the brake pedal 10, will be described below.

A driving force of the motor 120 generates a displacement of the hydraulic piston 114 through the power converter 130, and a hydraulic pressure, which is generated while the hydraulic piston 114 slides inside the pressure chamber, is delivered to the wheel cylinder 40 installed at each of the wheels RR, RL, FR, and FL through the first and second hydraulic flow paths 211 and 212.

The power converter 130 is a device configured to convert a rotational force into a rectilinear movement, and as one example, may be configured with the worm shaft 131, the worm wheel 132, and the drive shaft 133.

The worm shaft 131 may be integrally formed with the rotation shaft of the motor 120, and a worm is formed on the outer circumferential surface of the worm shaft 131 to be engaged with the worm wheel 132 to rotate the worm wheel 132. The worm wheel 132 is coupled to the drive shaft 133 to linearly move the drive shaft 133. The drive shaft 133 is connected to the hydraulic piston 114 to slide the hydraulic piston 114 in the cylinder block 111.

That is, a signal, which is sensed by the pedal displacement sensor 11 when a displacement occurs at the brake pedal 10, is transmitted to the controller 300 and then the controller 300 drives the motor 120 in one direction to rotate the worm shaft 131 in that direction. A rotational force of the worm shaft 131 is transmitted to the drive shaft 133 via the worm wheel 132, and then the hydraulic piston 114 connected to the drive shaft 133 is moved forward to generate a hydraulic pressure in the first pressure chamber 112.

On the other hand, when the pedal effort is released from the brake pedal 10, the controller 300 drives the motor 120 in a reverse direction, and thus the worm shaft 131 is reversely rotated. Consequently, the worm wheel 132 is also reversely rotated, and thus a negative pressure is generated in the first pressure chamber 112 while the hydraulic piston 114 connected to the drive shaft 133 is returned to its original position, that is, moved backward.

It is possible for generation of the hydraulic pressure and the negative pressure to be opposite to that which is described above. That is, a signal, which is sensed by the pedal displacement sensor 11 when a displacement occurs at the brake pedal 10, is transmitted to the controller 300 and then the controller 300 drives the motor 120 in a reverse direction to rotate the worm shaft 131 in the reverse direction. A rotational force of the worm shaft 131 is transmitted to the drive shaft 133 via the worm wheel 132, and then the hydraulic piston 114 connected to the drive shaft 133 is moved backward to generate a hydraulic pressure in the second pressure chamber 113.

On the other hand, when the pedal effort is released from the brake pedal 10, the controller 300 drives the motor 120 in one direction, and thus the worm shaft 131 is rotated in that direction. Consequently, the worm wheel 132 is also reversely rotated, and thus a negative pressure is generated in the second pressure chamber 113 while the hydraulic piston 114 connected to the driving shaft 133 is returned to its original position, that is, moved forward.

As described above, the hydraulic pressure supply device 100 serves to deliver the hydraulic pressure to the wheel cylinders 40 or to suction and deliver the hydraulic pressure to the reservoir 30 according to a rotational direction of the rotational force generated from the motor 120.

When the motor 120 is rotated in one direction, the hydraulic pressure may be generated in the first pressure chamber 112 or the negative pressure may be generated in the second pressure chamber 113, and whether the hydraulic pressure is used for braking or the negative pressure is used for releasing braking may be determined through the control of the valves 54, 60, 221a, 221b, 221c, 221d, 222a, 222b, 222c, 222d, 233, 235, 236, and 243.

Although not shown in the drawings, the power converter 130 may be formed of a ball screw nut assembly. For example, a screw is formed integrally with the rotating shaft of the motor 120 or connected to rotate as the rotating shaft of the motor 120, and a ball nut is screwed with the screw in a limited rotation state to linearly move according to the rotation of the screw. The hydraulic piston 114 may be connected to the ball nut of the power converter 130 to press the pressure chamber by the linear movement of the ball nut. The structure of such a ball screw nut assembly is a device for converting rotational motion into linear motion and is a well-known technique as well known in the art, and thus a detailed description thereof will be omitted.

Further, it should be understood that the power converter 130 according to the embodiment of the present disclosure may employ any structure capable of converting a rotational movement into a rectilinear movement, in addition to the structure of a ball screw nut assembly.

In addition, the electric brake system 1 according to the embodiment of the present disclosure may include the first and second backup flow paths 251 and 252 which can supply the oil discharged from the master cylinder 20 directly to the wheel cylinder 40 when it is operating abnormally (fallback mode).

The first cut valve 261 configured to control the oil flow may be provided at the first backup flow path 251, and the second cut valve 262 configured to control the oil flow may be provided at the second backup flow path 252. Also, the first backup flow path 251 may connect the first hydraulic pressure port 24a to the first hydraulic pressure circuit 201, and the second backup flow path 252 may connect the second hydraulic pressure port 24b to the second hydraulic pressure circuit 202.

Further, the first and second cut valves 261 and 262 may be configured with normally open type solenoid valves that are closed when a closing signal is received from the controller 300.

Next, the hydraulic pressure controller 200 according to the embodiment of the present disclosure will be described with reference to FIG. 2.

The hydraulic pressure controller 200 may be configured with the first hydraulic pressure circuit 201 and the second hydraulic pressure circuit 202 in which each receives a hydraulic pressure and controls two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The first and second hydraulic pressure circuits 201 and 202 may be provided with a plurality of the inlet valves 221 (that is, 221a, 221b, 221c, and 221d) to control the flow of the hydraulic pressure. As one example, two of the inlet valves 221a and 221b may be provided at the first hydraulic pressure circuit 201 and connected to the first hydraulic flow path 211 to control the hydraulic pressure delivered to two of the wheel cylinders 40. Also, two of the inlet valves 221c and 221d may be provided at the second hydraulic pressure circuit 202 and connected to the second hydraulic flow path 212 to control the hydraulic pressure delivered to two of the wheel cylinders 40.

Further, the plurality of inlet valves 221 may be disposed at an upstream side of each of the wheel cylinders 40 and may be configured with normally open type solenoid valves that are closed when a closing signal is received from the controller 300.

If a leak occurs due to oil leakage of the flow path in the electric brake system 1, normal braking becomes impossible. That is, when the leak occurs in the electric brake system 1, the oil flow of the first and second hydraulic pressure circuits 201 and 202 must be blocked by closing the inlet valve 221 provided in the first and second hydraulic pressure circuits 201 and 202 affected by the generated leak.

As described above, the inlet valve 221 provided in the first and second hydraulic pressure circuits 201 and 202 is opened in a normal state and then operated to close the valve when the closing signal is received. Thus, when the leak occurs, the controller 300 may generate a control signal for closing the inlet valve 221.

The controller 300 may control the opening and closing of the inlet valve 221 by applying the current to the inlet valve 221. When a high current is applied to close the inlet valve 221, there is a problem of heat generation and a time limit for driving the valve is constrained. Accordingly, when the leak occurs in the electric brake system 1, the controller 300 needs to control the amount of current applied to the inlet valve 221. This will be described later in detail.

At least one of the inlet valves 221 may be independently controlled according to the control of the controller 300. That is, the inlet valves 221a and 221b provided in the first hydraulic pressure circuit 201 and the inlet valves 221c and 221d provided in the second hydraulic pressure circuit 202 may be independently controlled by the controller 300, respectively.

Referring to FIG. 2, the two inlet valves 221a and 221b provided in the first hydraulic pressure circuit 201 may be closed according to the control of the controller 300. That is, when the leak that occurred in the electric brake system 1 affects the first hydraulic pressure circuit 201, the controller 300 may control the valve driver 330 to apply current to the inlet valves 221a and 221b provided in the first hydraulic pressure circuit 201 and the inlet valves 221a and 221b may be closed based on the applied current.

Figure 3:
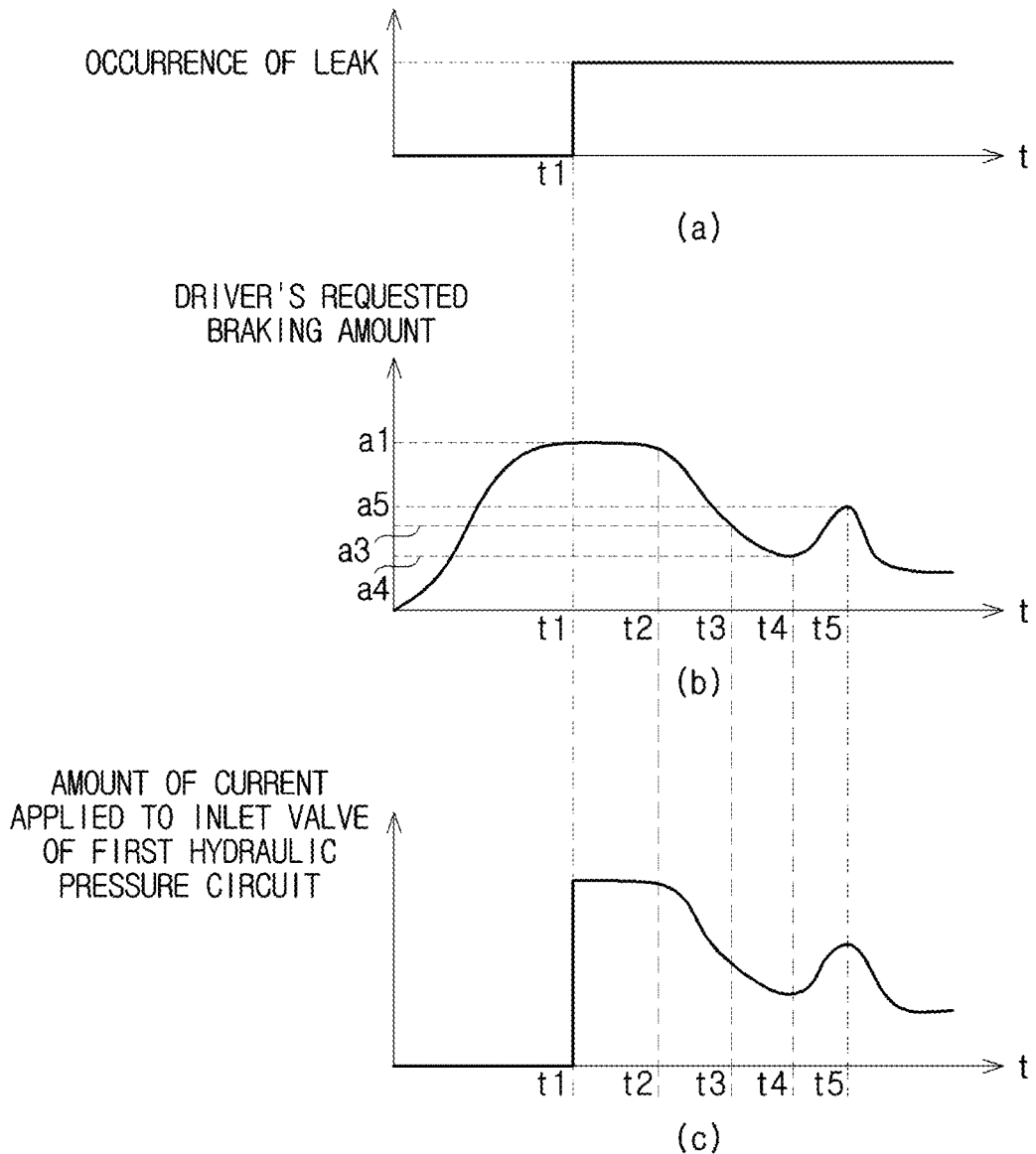
FIGS. 3 and 4 are graphs illustrating the control of an amount of current applied to the inlet valve based on the requested braking amount according to a driver's deceleration intent according to an embodiment.

Similarly, referring to FIG. 3, the two inlet valves 221c and 221d provided in the second hydraulic pressure circuit 202 may be closed according to the control of the controller 300. That is, when the leak that occurred in the electric brake system 1 affects the second hydraulic pressure circuit 202, the controller 300 may control the valve driver 330 to apply current to the inlet valves 221c and 221d provided in the second hydraulic pressure circuit 202 and the inlet valves 221c and 221d may be closed based on the applied current.

When the inlet valve 221 is closed, the hydraulic pressure transmitted from each of the first and second hydraulic pressure circuits 201 and 202 to the wheel cylinder 40 may be blocked. When the hydraulic pressure transmitted to the wheel cylinder 40 is blocked, the brakes are not applied to the wheels FR, FL, RR, and RL. Therefore, when the leak occurs, the inlet valve 221 is closed and the wheel connected to the closed inlet valve 221 is not braked.

The first and second hydraulic pressure circuits 201 and 202 may include check valves 223a, 223b, 223c, and 223d which are provided at a bypass flow path connecting a front side to a rear side of each of the inlet valves 221a, 221b, 221c, and 221d, respectively. Each of the check valves 223a, 223b, 223c, and 223d may be provided to allow oil to flow only in a direction from the wheel cylinder 40 to the hydraulic pressure supply unit 110 and block oil from flowing in a direction from the hydraulic pressure supply unit 110 to the wheel cylinder 40. Each of the check valves 223a, 223b, 223c, and 223d may be operated to rapidly discharge a braking pressure from the wheel cylinder 40, and allow the hydraulic pressure of the wheel cylinder 40 to be delivered to the hydraulic pressure supply unit 110 when the inlet valves 221a, 221b, 221c, and 221d are operated abnormally.

Also, the first and second hydraulic pressure circuits 201 and 202 may be further provided with a plurality of the outlet valves 222 (that is, 222a, 222b, 222c, and 222d) connected to the reservoirs 30 to improve the brake release performance when braking is released. Each of the outlet valves 222 is connected to the wheel cylinder 40 to control discharging of the hydraulic pressure from each of the wheels RR, RL, FR, and FL. That is, when a braking pressure of each of the wheels RR, RL, FR, and FL is sensed and a decompression of the braking is determined as being requested, the outlet valves 222 may be selectively opened to control the braking pressure.

Further, the outlet valve 222 may be configured with normally closed type solenoid valves that are opened when an opening signal is received from the controller 300.

In addition, the hydraulic pressure controller 200 may be connected to the first and second backup flow paths 251 and 252. As one example, the first hydraulic pressure circuit 201 may be connected to the first backup flow path 251 to receive the hydraulic pressure provided from the master cylinder 20, and the second hydraulic pressure circuit 202 may be connected to the second backup flow path 252 to receive the hydraulic pressure provided from the master cylinder 20.

At this point, the first backup flow path 251 may be connected to the first hydraulic pressure circuit 201 at an upstream side of each of the first and second inlet valves 221a and 221b. Similarly, the second backup flow path 252 may be connected to the second hydraulic pressure circuit 202 at an upstream side of each of the third and fourth inlet valves 221c and 221d. Consequently, when the first and second cut valves 261 and 262 are closed, the hydraulic pressure provided from the hydraulic pressure supply device 100 may be supplied to the wheel cylinders 40 through the first and second hydraulic pressure circuits 201 and 202, and, when the first and second cut valves 261 and 262 are open, the hydraulic pressure provided from the master cylinder 20 may be supplied to the wheel cylinders 40 through the first and second backup flow paths 251 and 252. At this point, since the plurality of inlet valves 221a, 221b, 221c, and 221d are each in an open state, there is no need to switch their operation states.

Meanwhile, unexplained reference numeral PS11 is a first hydraulic flow path pressure sensor configured to sense the hydraulic pressure of the first hydraulic pressure circuit 201, reference numeral PS12 is a second hydraulic flow path pressure sensor configured to sense the hydraulic pressure of the second hydraulic pressure circuit 202, reference numeral PS2 is a backup flow path pressure sensor configured to measure the oil pressure of the master cylinder 20, and reference numeral MPS is a motor control sensor configured to control the rotation angle of the motor 120 or the current of the motor 120.

Hereinafter, a method for controlling the amount of current applied to the inlet valve 221 based on the driver's braking intent will be described in detail.

Figure 4:
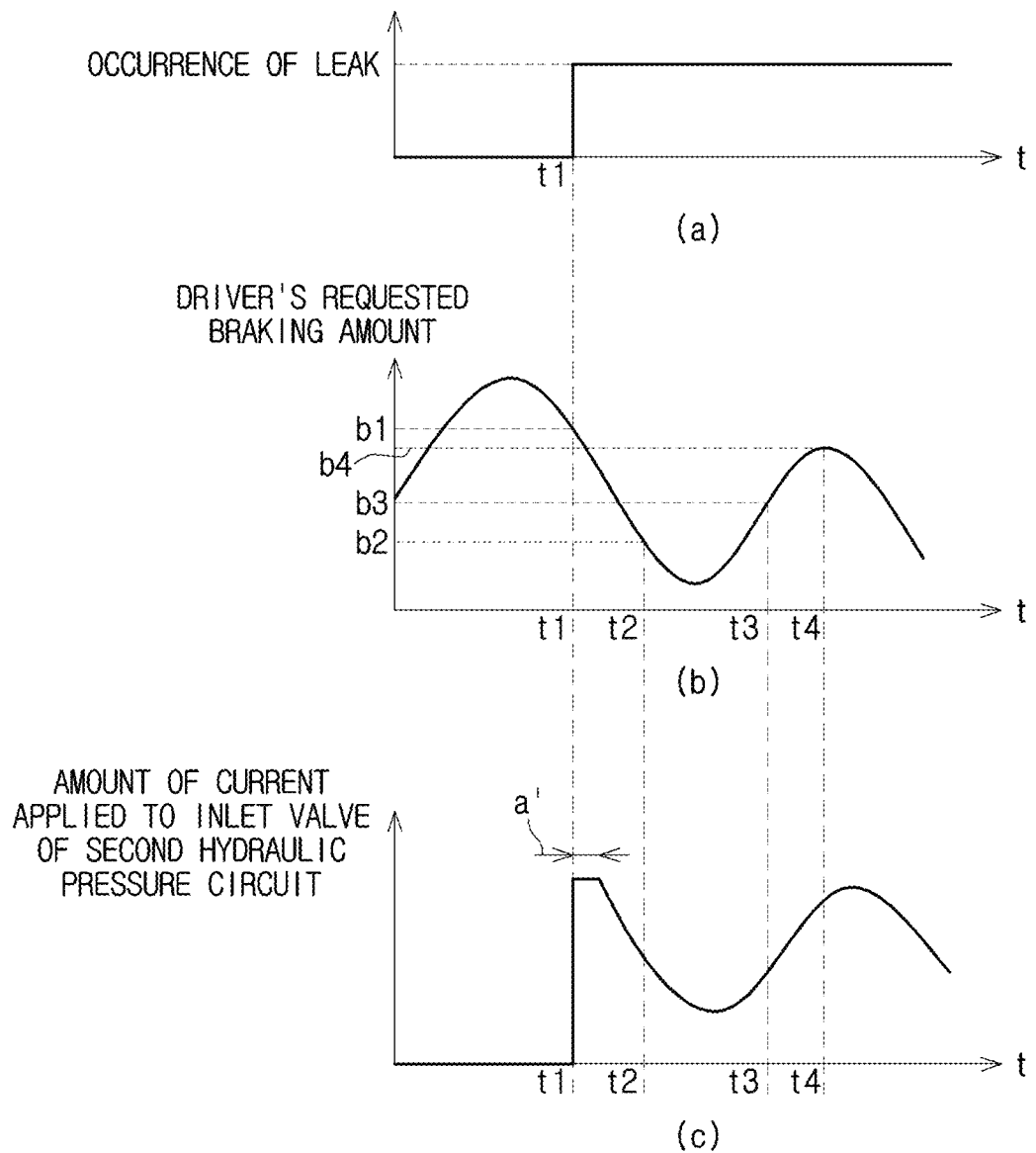
Figure 5:
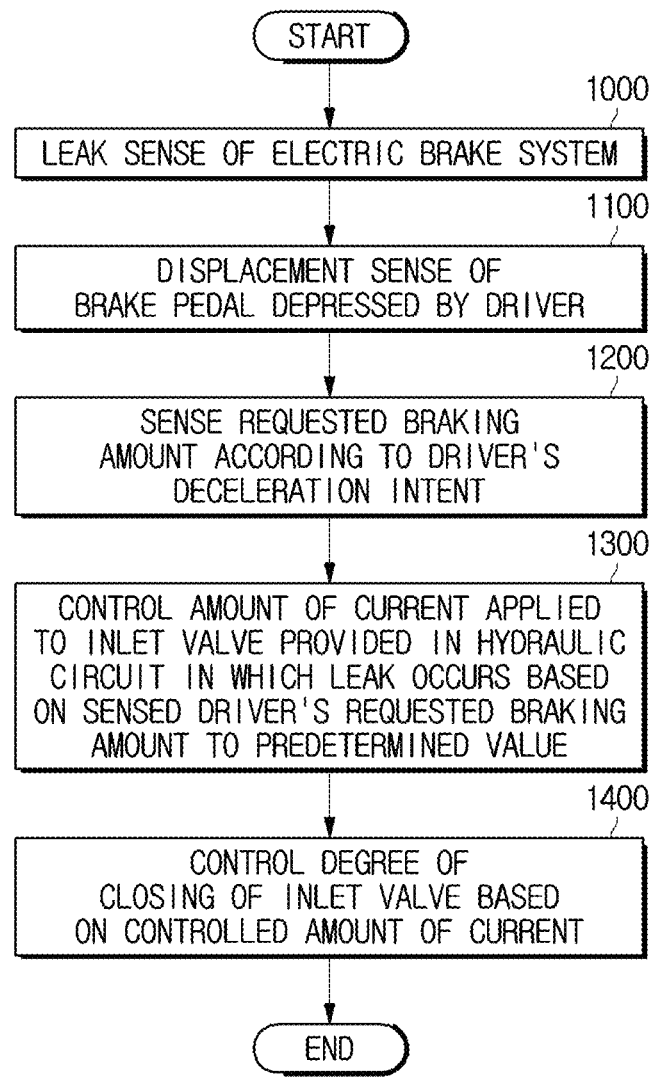
FIGS. 5 and 6 are flowcharts illustrating a brake control method according to an embodiment.
Figure 6:
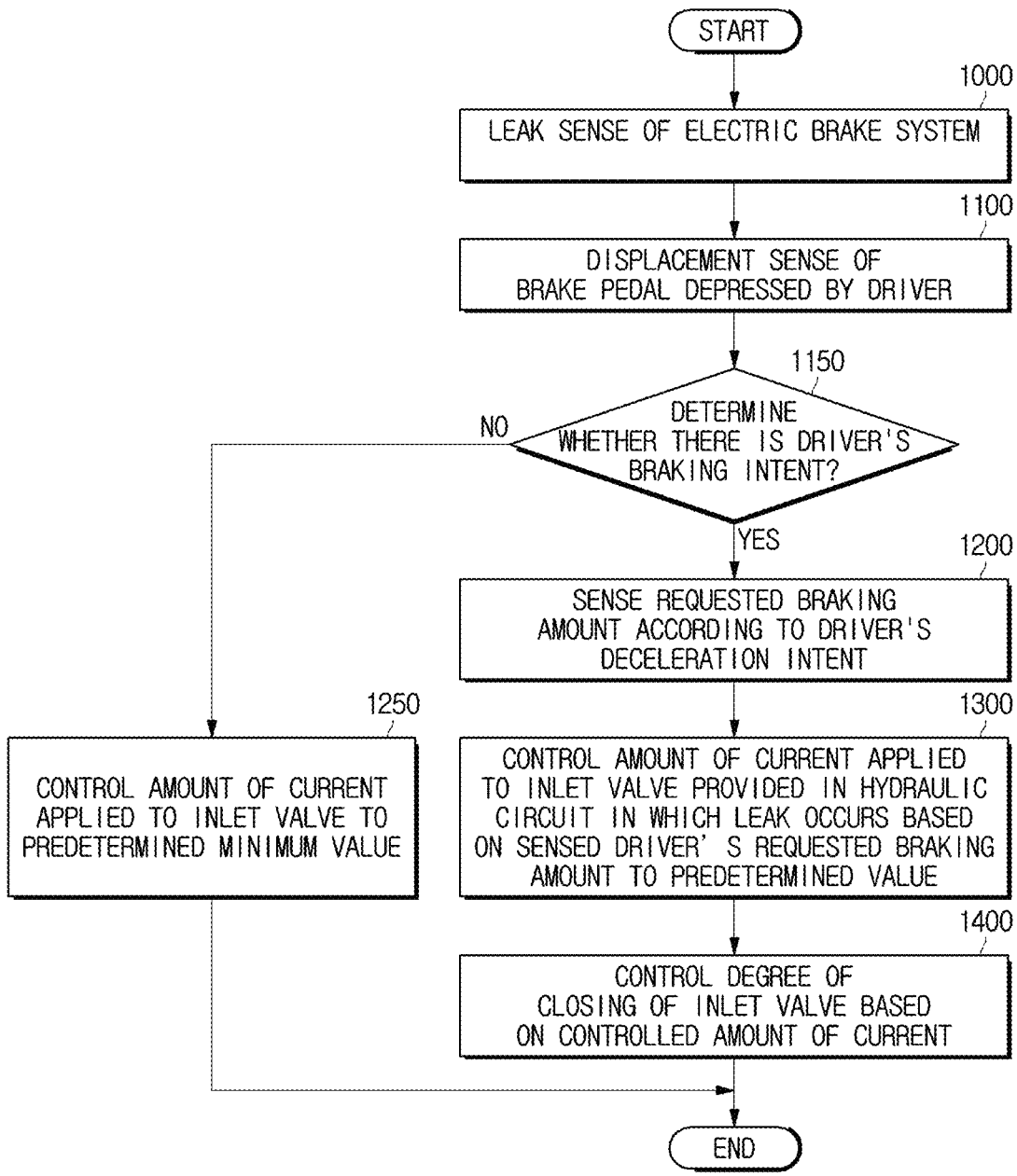

FIGS. 3 and 4 are graphs illustrating the control of the amount of current applied to the inlet valve based on the requested braking amount according to a driver's deceleration intent according to an embodiment, and FIGS. 5 and 6 are flowcharts illustrating a brake control method according to an embodiment.

Referring to FIG. 3, a pressure sensor 420 may sense the leak of the electric brake system 1 (1000). That is, the pressure sensor 420 may sense the hydraulic pressure in the hydraulic flow path or the first and second hydraulic pressure circuits 201 and 202 to sense whether or not the hydraulic pressure is leaking.

The pressure sensor 420 may include the first hydraulic flow path pressure sensor PS11 configured to sense the hydraulic pressure of the first hydraulic pressure circuit 201, the second hydraulic flow path pressure sensor PS12 configured to sense the hydraulic pressure of the second hydraulic pressure circuit 202, and the backup flow path pressure sensor PS2 configured to measure the oil pressure of the master cylinder 20.

The pressure sensor 420 may sense the leak by comparing the sensed hydraulic pressure on the electric brake system 1 with a predetermined set value or by sensing the flow rate discharged from the wheel cylinder 40. In addition, the controller 300 may sense the unbalanced state of the pressure by determining the hydraulic pressure of the first hydraulic pressure circuit 201 and the hydraulic pressure of the second hydraulic pressure circuit 202 from the first hydraulic flow path pressure sensor PS1.

The pressure sensor 420 may sense the leakage of the electric brake system 1 and may transmit the electrical signal to the controller 300. The controller 300 may determine that the leak has occurred at time t1 as illustrated in FIG. 3A.

The pedal displacement sensor 410 may sense the amount of requested braking according to the deceleration intent of the driver. That is, when the braking by the driver is started, the pedal displacement sensor 410 may sense the driver's requested braking amount based on information such as the pressure of the brake pedal 10 that the driver depresses. The pedal displacement sensor 410 may sense the displacement of the brake pedal 10 depressed by the driver (1100) and sense the requested braking amount according to the driver's deceleration intent (1200).

When the brake pedal 10 is displaced according to the driver's braking, the signal sensed by the pedal displacement sensor 410 may be transmitted to the controller 300.

The controller 300 may determine the requested braking amount according to the driver's deceleration intent based on the signal received from the pedal displacement sensor 410. In other words, the controller 300 may determine that the greater the requested braking amount, the greater the driver's deceleration intent.

The requested braking amount of the driver determined by the controller 300 may be illustrated in the form of FIG. 3B. As illustrated in FIG. 3B, the driver's braking amount gradually increases and illustrates the largest value a1 between t1 and t2. This means that the driver's deceleration intent determined by the controller 300 during the time between t1 and t2 is the largest.

Also, during the time between t2 and t3, the driver's requested braking amount gradually decreases from a1 to a3, and during the time between t4 to t5, the driver's braking amount gradually increases from a4 to a5.

When the deceleration intent of the driver is large in the electric brake system 1 in which the leak occurs, the amount of current applied to the inlet valve 221 provided in the first and second hydraulic pressure circuits 201 and 202 affected by the leak is increased to close the inlet valve 221.

On the other hand, when the deceleration intent of the driver is small in the electric brake system 1 in which the leak occurs, the amount of current applied to the inlet valve 221 provided in the first and second hydraulic pressure circuits 201 and 202 affected by the leak is decreased, thereby securing the driving time of the inlet valve 221 and increasing the fuel consumption of the vehicle.

As illustrated in FIG. 3C, the controller 300 may control the amount of current applied to the inlet valve 221 provided in the first and second hydraulic pressure circuits 201 and 202 in which the leak occurs based on the requested braking amount according to the deceleration intent of the driver to a predetermined value (1300). The predetermined value for controlling the amount of current applied to the inlet valve 221 may be stored in the memory 320 in advance with data corresponding to the requested braking amount according to the driver's deceleration intent.

That is, the controller 300 may generate the control signal that increases the amount of current applied to the inlet valve 221 when the driver's requested braking amount is equal to or greater than the predetermined value. The controller 300 may generate the control signal that decreases the amount of current applied to the inlet valve 221 when the driver's requested braking amount is less than the predetermined value.

The controller 300 may control the degree of closing of the inlet valve 221 based on the controlled amount of current (1400), and the signal generated by the controller 300 is transmitted to the valve driver 330 to control the degree to which the inlet valve 221 is closed.

In FIG. 3, the case where the leak generated in the system affects the first hydraulic pressure circuit 201 will be described as an example. The controller 300 may control the amount of the current applied to the inlet valves 221a and 221b provided in the first hydraulic pressure circuit 201 to the predetermined value corresponding to the driver's requested braking amount changed as illustrated in FIG. 3B.

That is, since the driver's requested braking amount is greatest between t1 and t2, the amount of current applied to the inlet valves 221a and 221b provided in the first hydraulic pressure circuit 201 may be increased to control the degree of closing of the inlet valves 221a and 221b to be relatively large.

Meanwhile, since the driver's requested braking amount is relatively small in the time after t5, the amount of current applied to the inlet valves 221a and 221b provided in the first hydraulic pressure circuit 201 may be decreased to control the degree of closing of the inlet valves 221a and 221b to be relatively small.

The controller 300 may determine whether there is the driver's braking intent based on the displacement or the pressure of the brake pedal depressed by the driver (1150). That is, the larger the requested braking amount according to the driver's deceleration intent, the greater the braking intent of the driver may be determined. As a result of the determination, when the controller 300 determines that there is no braking intention of the driver, the controller 300 may control the amount of current applied to the inlet valve 221 to the predetermined minimum value to minimize the degree of closing of the inlet valve 221. At this time, the predetermined value for controlling the amount of current may be stored in the memory 320 in advance with data corresponding to the requested braking amount according to the driver's deceleration intent.

In this way, the controller 300 may control the amount of the current applied to the inlet valves 221a and 221b provided in the first hydraulic pressure circuit 201 to the predetermined value corresponding to the sensed driver's requested braking amount, and the amount of current corresponding to the driver's requested braking amount determined by the controller 300 may be applied to the inlet valves 221a and 221b.

Referring to FIG. 4, the pressure sensor 420 may sense the leak of the electric brake system 1 (1000) and may transmit the electrical signal to the controller 300. The controller 300 may determine that the leak has occurred at time t1 as illustrated in FIG. 4A.

Also, the controller 300 may determine the requested braking amount according to the driver's deceleration intent (1200) based on the signal received from the pedal displacement sensor 410 (1100). The requested braking amount of the driver determined by the controller 300 may be illustrated in the form of FIG. 4B.

As shown in FIG. 4B, the driver's braking amount gradually decreases between t1 and t2, and illustrates the smallest value between t2 and t3. This means that the deceleration intent of the driver determined by the controller 300 during the time between t1 and t2 is gradually decreasing.

In addition, the driver's braking amount is gradually increasing between t3 and t4, which means that the driver's deceleration intent be increasingly determined by the controller 300 during the time between t3 and t4.

That is, during the time between t1 and t2, the driver's requested braking amount gradually decreases from b1 to b2, and during the time between t3 and t4, the driver's braking amount gradually increases from b3 to b4.

As illustrated in FIG. 4C, the controller 300 may control the amount of current applied to the inlet valve 221 provided in the first and second hydraulic pressure circuits 201 and 202 in which the leak occurs based on the requested braking amount according to the deceleration intent of the driver to a predetermined value (1300). The predetermined value for controlling the amount of current applied to the inlet valve 221 may be stored in the memory 320 in advance with data corresponding to the requested braking amount according to the driver's deceleration intent.

That is, the controller 300 may generate the control signal that increases the amount of current applied to the inlet valve 221 when the driver's requested braking amount is equal to or greater than the predetermined value. The controller 300 may generate the control signal that decreases the amount of current applied to the inlet valve 221 when the driver's requested braking amount is less than the predetermined value.

The controller 300 may control the degree of closing of the inlet valve 221 based on the controlled amount of current (1400), and the signal generated by the controller 300 is transmitted to the valve driver 330 to control the degree to which the inlet valve 221 is closed.

In FIG. 4, the case where the leak generated in the system affects the second hydraulic pressure circuit 202 will be described as an example. The controller 300 may control the amount of the current applied to the inlet valves 221c and 221d provided in the second hydraulic pressure circuit 202 to the predetermined value corresponding to the driver's requested braking amount changed as illustrated in FIG. 4B.

However, in the embodiment of FIG. 4, the amount of current applied after the amount of current applied to the inlet valves 221c and 221d provided in the second hydraulic pressure circuit 202 is maintained for a [sec] as the amount of the initially applied current may be linearly adjusted to a predetermined value.

That is, since the driver's requested braking amount gradually decreases between t1 and t2, the amount of current applied to the inlet valves 221c and 221d provided in the second hydraulic pressure circuit 202 may be linearly decreased after a [sec] so that the degree of closing of the inlet valves 221a and 221b can be controlled to be relatively small.

Meanwhile, since the driver's requested braking amount gradually increases between t3 and t4, the amount of current applied to the inlet valves 221c and 221d provided in the second hydraulic pressure circuit 202 may be increased to control the degree of closing of the inlet valves 221a and 221b to be relatively large.

In this way, the controller 300 may control the amount of the current applied to the inlet valves 221c and 221d provided in the second hydraulic pressure circuit 202 to the predetermined value corresponding to the sensed driver's requested braking amount, and the amount of current corresponding to the driver's requested braking amount determined by the controller 300 may be applied to the inlet valves 221c and 221d.

As is apparent from the above description, the electric brake system 1 according to the embodiments of the present disclosure can secure the valve driving time by controlling the amount of current applied to the valve in response to the driver's braking intent and prevent leaks that occur in the electric brake system 1, thereby securing the braking force of the vehicle.

In addition, it is possible to minimize the amount of current applied to the valve according to the driver's braking intent and thereby to improve the fuel efficiency of the vehicle and reduce noise that may occur when a high current is applied.

Meanwhile, the embodiments of the present disclosure may be implemented in the form of recording media for storing instructions to be carried out by a computer. The instructions may be stored in the form of program codes, and when executed by a processor, may generate program modules to perform operations in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, and the like The exemplary embodiments of the present disclosure have thus far been described with reference to the accompanying drawings. It will be obvious to people of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. An electric brake system comprising:
a hydraulic pressure supply device configured to generate hydraulic pressure, transmitted to wheel cylinders provided at wheels, using a force generated by a motor;
a plurality of valves provided at a plurality of flow paths connecting between the hydraulic pressure supply device and the wheel cylinders, the valves configured to control amounts of the hydraulic pressure to the wheel cylinders; and
a controller configured to:
receive an amount of requested braking, and
in response to detection of leak that affects one of the plurality of flow paths, adjust an amount of current supplied to one of the valves, provided at the one of the plurality of flow paths affected by the leak, based on the received amount of the requested braking so that a degree of closing the one of the valves, provided at the one of the plurality of flow paths affected by the leak, is adjusted according to the received amount of the requested braking.

2. The electric brake system according to claim 1, further comprising:
a master cylinder configured to discharge oil according to a stroke of a brake pedal;
a first hydraulic pressure circuit configured to transmit the hydraulic pressure discharged from the hydraulic pressure supply device to a wheel cylinder provided in at least one of the wheels; and
a second hydraulic pressure circuit configured to transmit the hydraulic pressure discharged from the hydraulic pressure supply device to another wheel cylinder provided in another at least one of the wheels,
wherein the hydraulic pressure supply device is connected to the master cylinder and a reservoir in which oil is stored.

3. The electric brake system according to claim 2, wherein the controller is configured to control the amount of current supplied to the one of the valves included in a hydraulic circuit determined to be leaking to a predetermined value corresponding to the received amount of the received braking when the first hydraulic pressure circuit or the second hydraulic pressure circuit in the electric brake system is determined to be leaking.

4. The electric brake system according to claim 1, wherein the controller is configured to generated a control signal for increasing the amount of current supplied to the one of the valves, provided at the one of the plurality of flow paths affected by the leak, when the received amount of the requested braking is greater than or equal to a predetermined value and generate the control signal for decreaing the amount of current supplied to the one of the valves, provided at the one of the plurality of flow paths affected by the leak, when the received amount of the requested braking is less than the predetermined value.

5. The electric brake system according to claim 1, wherein the valves comprise an inlet vavle,
wherein the controller is configured to control the amount of current supplied to the inlet valve to control the degree to which the inlet valve is closed.

6. The electric brake system according to claim 5, wherein the inlet vavle is configured to be a normally open type that is opened when the current is not applied and is closed when the current is applied.

7. The electric brake system according to claim 1, wherein the controller is configured to control the amount of current supplied to the one of the valves, provided at the one of the plurality of flow paths affected by the leak, for controlling the amount of hydraulic pressure transmitted to one of the wheels, connected with the one of the plurality of flow paths affected by the leak, to a predetermined value after a preset threshold time in response to the received amount of the requested braking.

8. The electric brake system according to claim 1, wherein the pedal input sensing device comprises:
a pedal displacement sensor configured to sense a displacement of a brake pedal depressed by the driver.

9. The electric brake system according to claim 1, further comprising a pressure sensor configured to sense leak of a pressure circuit,
wherein the controller is configured to control the amount of current supplied to one of the valves, provided in the hydraulic pressure circuit in which the leak is sensed, based on the received amount of the requested braking.

10. The electric brake system of claim 1, wherein:
the plurality of valves provided at the plurality of flow paths connecting between the hydraulic pressure supply device and the wheel cylinders are a normally open type valve that is configured to be opened when the current is not applied and be closed when the current is applied, and
the controller is configured to, in response to the detection of leak that affects the one of the plurality of flow paths, supply no current to the valves except the one of the valves, provided at the one of the plurality of flow paths affected by the leak and provide the current to the one of the valves, provided at the one of the plurality of flow paths affected by the leak, wherein the amount of the current provided to the one of the valves, provided at the one of the plurality of flow paths affected by the leak, is changed based on the received amount of the requested braking.

11. An electric brake control method comprising:
receiving an amount of requested banking;
generating, by a hydraulic pressure supply device, hydraulic pressure, transmitted to wheel cylinders provided at wheels, using a force generated by a motor, wherein a plurality of vavles provided at a plurality of flow paths control amounts of the hydraulic pressure to the wheel cylinders; and
in responsee to detection of leak that affects one of a plurality of flow paths connecting between the hydraulic pressure supply device and the wheel cylinders, adjusting an amount of current supplied to one of the valves, provided at the one of the plurality of flow paths affected by the leak based on the received amount of the requested braking so that a degree of closing the one of the valves, provided at the one of the plurality of flow paths affected by the leak, is adjusted according to the received amount of the requested braking.

12. The method according to claim 11, wherein the adjusting of the amount of the current supplied to the one of the valves, provided at the one of the plurality of flow paths affected by the leak, comprises:
sensing the leak of a hydraulic pressure circuit; and
controlling the amount of current supplied to the one of the valves, provided in the hydraulic pressure circuit in which the leak is sensed, based on the received amount of the requested braking.

13. The method according to claim 12, wherein the adjusting of the amount of the current supplied to the one of the valves, provided at the one of the plurality of flow paths affected by the leak, comprises:
generating a control signal for increasing the amount of current supplied to the one of the valves, provided at the one of the plurality of flow paths affected by the leak, when the received amount of the requested braking is greater than or equal to the predetermined value and generating the control signal for decreasing the amount of current supplied to the one of the valves when the received amount of the requested braking is less than the predetermined value.

14. The method according to claim 11, wherein the adjusting of the amount of the current supplied to the one of the valves, provided at the one of the plurality of flow paths affected by the leak, further comprises:
controlling the amount of current supplied to the one of the valves, provided at the one of the plurality of flow paths affected by the leak, to control the degree to which the one of the valves, provided at the one of the plurality of flow paths affected by the leak, is closed.

15. The method according to claim 11, wherein the sensing of the amount of requested braking according to the deceleration intent of the driver comprises:
sensing a displacement of a brake pedal depressed by the driver and sensing the requested braking amount.

16. The method of claim 11, wherein:
the plurality of valves provided at the plurality of flow paths connecting between the hydraulic pressure supply device and the wheel cylinders are a normally open type valve that is configured to be opened when the current is not applied and be closed when the current is applied, and
the method further comprises, in response to the detection of leak that affects the one of the plurality of flow paths, supplying no current to the valves except the one of the valves, provided at the one of the plurality of flow paths affected by the leak, so that one or more of the valves, not provided at the one of the plurality of flow paths affected by the leak, are to be opened.

* * * * *